United States Patent [19]

Burgin

[11] 3,913,239

[45] Oct. 21, 1975

[54] GRAIN DRYING STORAGE BIN

[76] Inventor: Kermit H. Burgin, R.R. No. 1, Whitestown, Ind. 46075

[22] Filed: Nov. 29, 1974

[21] Appl. No.: 528,080

[52] U.S. Cl. .................... 34/102; 34/65; 34/174; 34/177
[51] Int. Cl.² ........................................ F26B 25/00
[58] Field of Search ....... 34/11, 57 R, 98, 102, 174, 34/175, 176, 65, 177, 66; 98/52, 54, 55

[56] References Cited
UNITED STATES PATENTS

| | | | |
|---|---|---|---|
| 2,858,620 | 11/1958 | Naylor | 34/102 |
| 3,325,913 | 6/1967 | Maus | 34/174 |
| 3,357,110 | 12/1967 | Burgin | 34/174 |

FOREIGN PATENTS OR APPLICATIONS

| | | | |
|---|---|---|---|
| 11,946 | 5/1894 | United Kingdom | 34/102 |

*Primary Examiner*—Kenneth W. Sprague
*Assistant Examiner*—James C. Yeung
*Attorney, Agent, or Firm*—William R. Coffey

[57] ABSTRACT

Grain drying and storage apparatus comprising an upstanding storage bin for receiving grain, a system for heating the grain in the lower portion of the bin to cause it to sweat, a conveyor for conveying the grain from the lower portion of the bin upwardly, and a system in the upper portion of the bin to cool and dry the grain conveyed upwardly. The cooling and drying system includes a passageway through which the heated grain moves and a blower system for moving air through the grain in the passageway. The heating system preferably includes a source of liquid and conduits connecting the source of liquid to the grain bin to be in heat-conducting relation with the grain in the bin, a pump for circulating the liquid from the source through the conduits and back into the source, and a heater for the liquid.

6 Claims, 3 Drawing Figures

GRAIN DRYING STORAGE BIN

The present invention relates to grain drying and storage bins and more particularly to the provision of such a bin which has a hot water or hot liquid system for heating the grain to cause it to sweat and a system for cooling and drying the grain after it is heated.

All sorts of grain drying systems and grain drying bins have been suggested by the prior art. Reference is made, for instance, to my U.S. Pat. No. 3,766,664 issued Oct. 23, 1973 and the patent references cited therein including U.S. Pat. Nos. 3,487,961 and 3,538,618 as well as an earlier U.S. Pat. No. 3,357,110 issued to me. These prior patents establish well-known reasons for circulating the grain within the storage bin while the grain is being dried. It is conventional to have a storage bin with a perforated floor through which the heated air may flow to dry the grain. Usually, bins are constructed to have such a perforated floor elevated a distance above the ground, and warm air is forced into the bin in the space under the floor to move upwardly through the floor and through the grain and out through the exhaust openings in the top of the bin.

My United States Pat. No. 3,766,664 discloses a bin having a rotatable floor with vanes on the floor for drawing the grain radially inwardly so that it can be conveyed upwardly to the top of the bin.

One object of the present invention is to use a hot water grain drying system which heats the grain only to the extent that it is caused to sweat. The prior art shows systems which involve hot water circulation. See, for instance, U.S. Pat. Nos. 928,541 issued July 20, 1909; 2,333,089 issued Nov. 2, 1943; 2,622,342 issued Dec. 23, 1952; and 2,706,343 issued Apr. 19, 1955, which are believed to be representative of such hot water systems. The Burkhardt U.S. Pat. No. 2,333,089 shows a grain dryer of the type used for drying grain before it is placed into a storage bin having a hot water or steam heating coil and fin assembly arranged such that the grain must pass over it to be heated with a small difference between the temperature of the heating fluid and the grain. A current of air is blown upwardly through the falling grain from a plenum chamber. The Oholm U.S. Pat. No. 2,706,343 shows a drying silo for grain which uses hot water pipes over which and between which the grain must move. The Oholm structure also is a dryer and not a storage bin. The Rowland U.S. Pat. No. 928,541 shows an alfalfa dryer mounted on a truck which uses hot water or steam heated tubes for heating the alfalfa. Finally, the Goulounes et al. U.S. Pat. No. 2,622,342 shows a dryer which is not really a grain dryer, but which uses hot water heating.

My present invention is an improvement over the prior art systems because it is ideally suited for use in large storage bins such that the grain does not have to be predried before it is placed into the bins. My system is advantageous because it does not subject the grain to extremely high or damaging temperatures. In my system, the grain in the lower portion of the storage bin is heated to cause it to sweat. The grain is continually being moved from the lower portion of the bin upwardly to the upper portion of the bin where it is dried and cooled by air movement. This is in contrast to conventional storage bin systems which involve blowing air upwardly through the perforated floor of the bin and then upwardly through the grain.

In this description, and in the claims appended hereto, the word "grain" is intended to refer to all types of grains and even legumes.

An object of the present invention is to provide a grain drying and storing apparatus comprising an upstanding storage bin for receiving grain, the bin having a lower portion and an upper portion, means for heating the grain in the lower portion to cause it to sweat, cooling and drying means disposed in the upper portion, and means for conveying the grain upwardly from the lower portion to the cooling and drying means. The cooling and drying means includes means defining a passageway through which the heated grain moves and blower means for moving air through the grain in the passageway.

Another object of my invention is to provide such a cooling and drying means including a generally conically shaped plenum chamber, the upper conical wall of which is perforated with the blower means being disposed to force air into the plenum chamber and outwardly through the upper perforated wall. The upper wall defines, in part, the said grain passageway. A conveyor means is provided to lift the grain fromm the bottom of the grain bin to deposit the grain on the upper conical wall of the plenum chamber for cascading movement downwardly thereover to fall back into the bin. Preferably, my system includes a conveyor means such as described in my U.S. Pat. No. 3,766,664 or such as described, for instance, in the United States Pat. Nos. 3,487,761 and 3,538,618. Such systems will continuously remove the bottom layer of grain from just above the floor in the bin toward the center of the bin so that it can be conveyed upwardly to the top of the bin.

Another object of my invention is to provide such a grain drying and storing apparatus in which the heating means includes a source of fluid, conduit means connecting the source of fluid to the lower portion of the bin, and means for heating the fluid source. The conduit means includes first conduit sections being in heat-conducting relationship with the grain in the lower portion of the bin. The conduit means may include second sections thereof defining radiator means for heating the air which is being forced into the space under the perforated floor of the bin.

Other objects and features of my present invention will become apparent as this description progresses.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
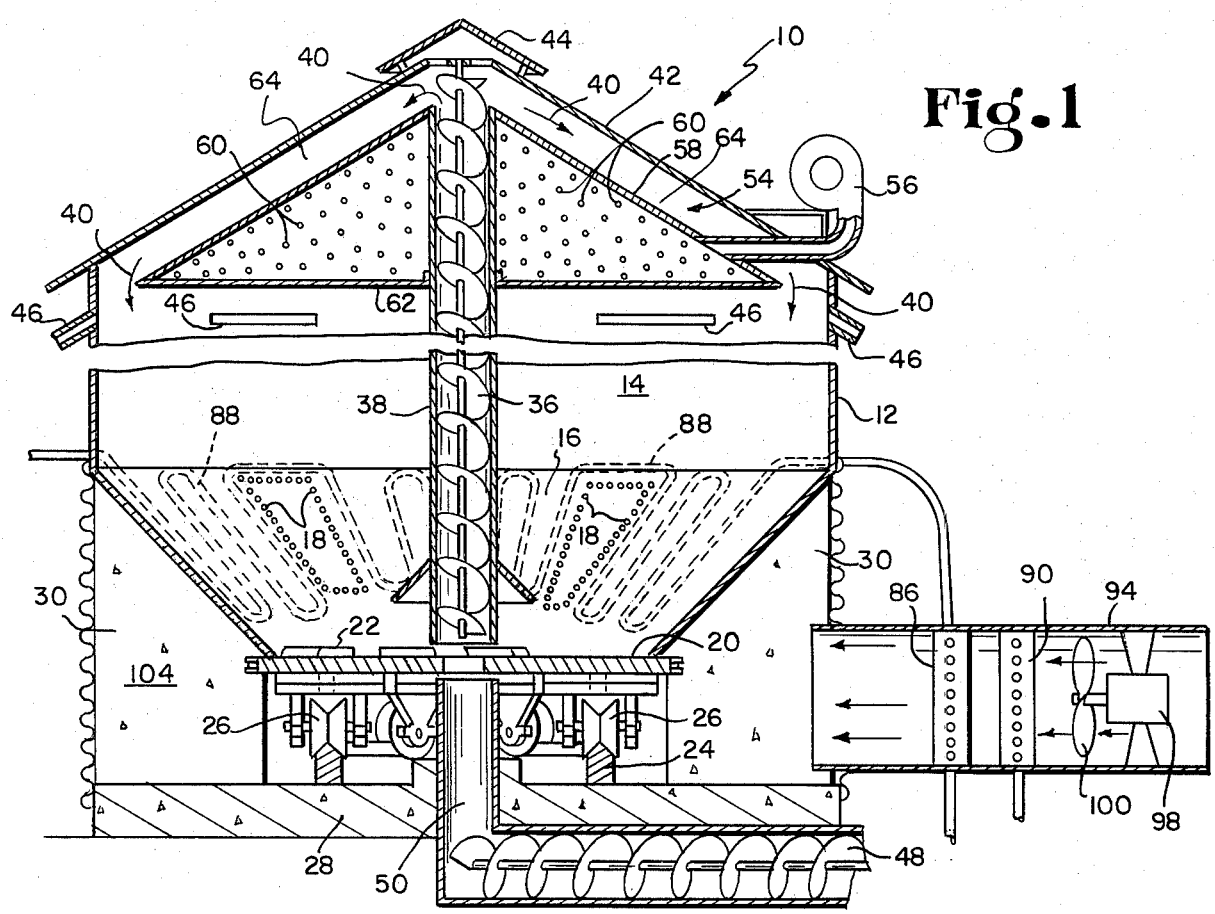
FIG. 1 is a fragmentary sectional view of a grain drying and storing bin in accordance with the present invention.

Referring now particularly to the drawings, it will be seen that the apparatus of the present invention is identified by the reference numeral 10 and includes a generally circular storage bin 12 having the usual storage space 14 therein. The bin of FIG. 1 has a conical lower wall portion which may be perforated as indicated at 18 and which directs the grain radially inwardly toward the rotating floor 20 upon which the vanes 22 are mounted in accordance with my U.S. Pat. No. 3,766,664. The floor 20 is supported for rotation about the axis of the bin on a track 24 by means of wheels 26. The track 24 is supported upon a concrete foundation 28 and the foundation includes peripherally spaced apart, upwardly extending pedestals 30 which support the bin and the side walls thereof. An auger 36 is disposed coaxially in the bin in the usual auger shell 38 to convey the grain from the center of the floor 20 radially upwardly to the top of the bin to deposit the grain for cascading movement in the direction of the arrows 40 backwardly down into the bin. The bin has a conical roof 42 with a conventional center vent 44. In addition to the vent 44, there are a plurality of vents 46 spaced peripherally about the upper side wall of the bin, which vents may be covered with hardware screen. For unloading the bin 12, in accordance with my U.S. Pat. No. 3,766,664, I provide an unloading auger 48 and a chute 50 leading downwardly to the auger 48 from the center of the rotating floor 20. During the drying operation, the opening in the center of the rotating floor 20 is closed so that the grain drawn radially inwardly to that center is moved upwardly by the auger 36.

Coaxially disposed in the upper portion of the bin 12 is a generally conical plenum chamber 54 into which air is forced by means of a blower 56. The upper wall 58 of the plenum chamber 54 is generally conical and perforated as indicated at 60 while the lower, horizontally extending wall 62 is not perforated. The angle of the upper wall 58 is generally the same as the roof 42 angle such that there is a conical space or passageway 64 between the upper perforated wall 60 of the plenum chamber 54 and the roof 42.

Turning now to the heating means 70 of the present invention, I show a tank 72 which is heated by a burner 74 supplied with fuel from a fuel source 76. A temperature gauge 78 is provided, and a pump 80 driven by a motor 82 pumps the liquid from the tank 72 through a first radiator means 86, a series of conduit sections 88, and then a second radiator means 90 and then back into the tank 72. The two radiator means 86, 90 are disposed in a blower housing 94 in which an electric motor 98 and fan blade 100 are arranged to force air through the radiator means and then into the space 104 under the floor of the bin.

In the embodiment of FIG. 1, the conduit section 88 is attached to the conical wall portion 16 to be in heat conducting relation with the grain resting thereagainst. The heated liquid leaving the tank 72, therefore, first is used to heat the radiator 86 and then it goes on to heat the conical wall portion 16 (FIG. 1) upon which the grain is resting to heat the grain. From this section 88, the liquid is exhausted back through the radiator means 90 to the tank 72, the radiator means 90 serving to preheat the air being forced through the radiator 86. This is, of course, an energy-saving system. If LP gas or oil gets in short supply, the tank 72 can be heated with any combustible material such as coal or wood. Drying occurs because warm air is being forced into the space 104 under the floor 20 which is preferably perforated and the conical wall 16 which is perforated to move upwardly through the grain. In addition, the grain directly against the heated conical wall portion 16 is heated to the point that it begins to sweat. That grain falls to the floor 20 to be conveyed radially inwardly and then upwardly by the auger 36 driven by the motor 36a to the top of the bin. The grain being deposited by the auger onto the top surface of the conical wall 58 cascades down that wall over the perforations 60 through which air is being forced by the blower means 56. This movement of the air through the perforation 60 cools the grain and dries the grain driving the moisture off through the vents 44, 46. The grain, of course, tumbles back into the bin to continue the process of working its way downwardly again toward the conical wall portion 16. After the grain is sufficiently dried, the heating means can be stopped and even the upper blower means 56 can be stopped leaving the second blower means consisting of the housing 94, motor 98 and fan 100 to keep air moving through the grain to prevent any spoilage.

Figure 2:
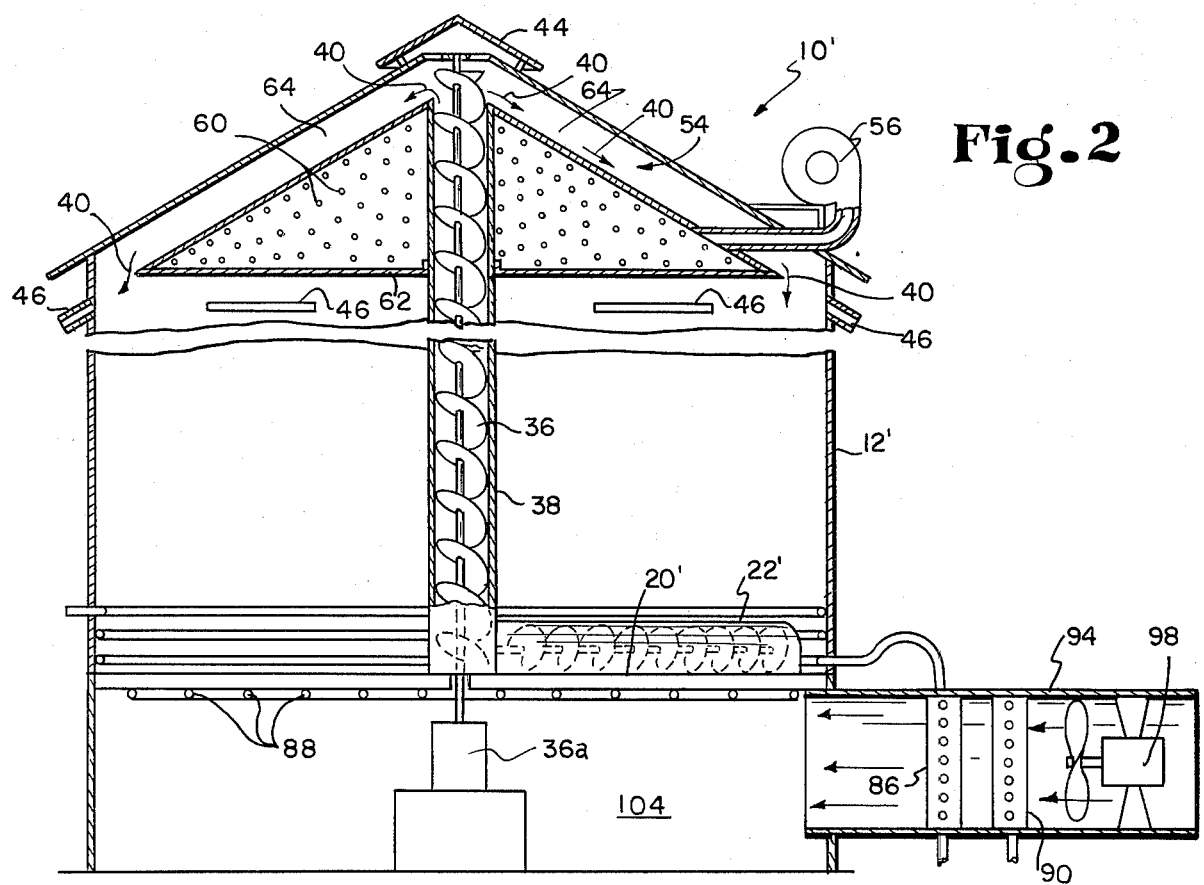
FIG. 2 is another fragmentary sectional view of a different embodiment of the present invention.
Figure 3:
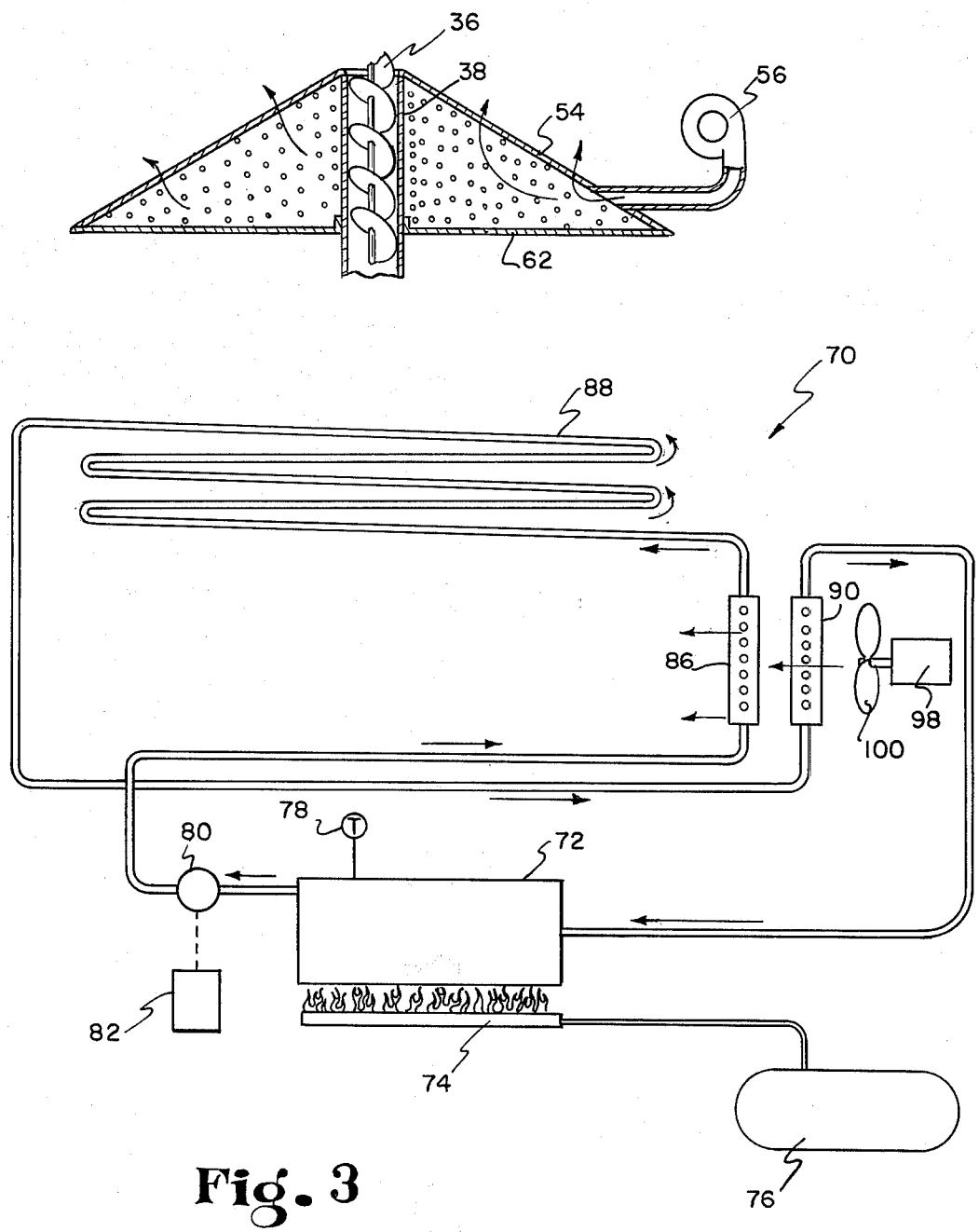
FIG. 3 is a diagrammatical view showing the heating means of the present invention together with the cooling and drying means of the present invention.

In the embodiment of FIG. 2, like reference numerals representing like parts, the floor 20' which is preferably perforated is stationary and a radially extending auger 22' moves about the axis of the bin picking grain upwardly from the floor and moving it radially inwardly to be lifted by the auger 36 to the top of the bin.

In either embodiment, the heating means 70 and even the second blower means in the blower housing 94 can be turned off to leave the upper blower means 56 operating in conjunction with the auger 36 to keep the grain moving and to dry the grain.

I claim:

1. Grain drying and storing apparatus comprising an upstanding storage bin for receiving grain, said bin having a lower portion and an upper portion, means for heating the grain in said lower portion to cause it to sweat, cooling and drying means in said upper portion, and means for conveying the grain upwardly from said lower portion to said cooling and drying means, said cooling and drying means including means defining a passageway through which the heated grain moves, and blower means for moving cool air through the grain in said passageway, said heating means including a source of fluid, conduit means connecting said source of fluid to the lower portion of said bin, said conduit means being in heat-conducting relationship with the grain in said lower portion, and means for heating the fluid source.

2. The invention of claim 1 in which said conduit means includes first sections thereof in heat conducting relationship to the grain in said lower portion and second sections thereof defining radiator means, said bin having a lower perforated floor upon which the grain rests, said first sections being in contact with said floor, said floor providing the upper wall of an air receiving space, and second blower means for moving air through said radiator means and into said space to provide movement of heated air upwardly through said floor and the grain in said bin.

3. The invention of claim 1 in which said cooling and drying means includes a generally conically shaped plenum chamber the upper conical wall of which is perforated, said blower means being disposed to force air into said plenum chamber and out through said upper wall, said upper wall defining, in part, said passageway, said conveying means being disposed to deposit the grain on said upper conical wall for tumbling movement downwardly thereover to fall into said bin.

4. Grain drying and storing apparatus comprising, in combination, a storage bin providing a grain storage space having a perforated floor and an air space below said floor, blower means for forcing air into said air space to move upwardly through said floor and the grain in said storage space, and heating means including a source of fluid, conduit means for connecting said source of fluid to said bin, means for heating the fluid, and means for circulating the fluid from said source through said conduit means and back to said source, said conduit means including first sections thereof in heat conducting relation with the grain in said storage space adjacent said floor to cause the grain to sweat and second sections thereof in heat conducting relation with the air being forced into said air space.

5. The invention of claim 4 including grain cooling and drying means and means for conveying the heated grain adjacent said floor to said cooling and drying means, said cooling and drying means including means defining a path of movement of the heated grain, and means for moving air through the grain as it passes through said path, thereby to cool and dry the grain.

6. The invention of claim 4 in which said source of fluid includes a tank of liquid, said heating means being arranged to heat said tank of liquid, said second conduit sections providing a pair of radiator means through which the air moves to be heated, said first conduit sections being disposed between said radiator means such that liquid leaving said tank moves through one of said radiator means, then through said first conduit sections and then through the other of said radiator means back into said tank to be heated, said other radiator means being disposed in said blower means upstream from said one radiator means to preheat the air.

* * * * *